United States Patent Office 3,347,143
Patented Oct. 17, 1967

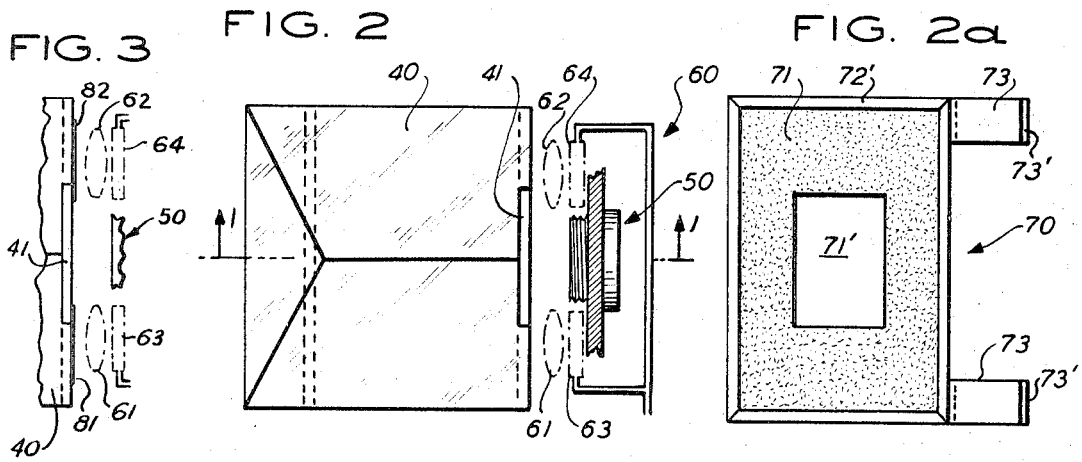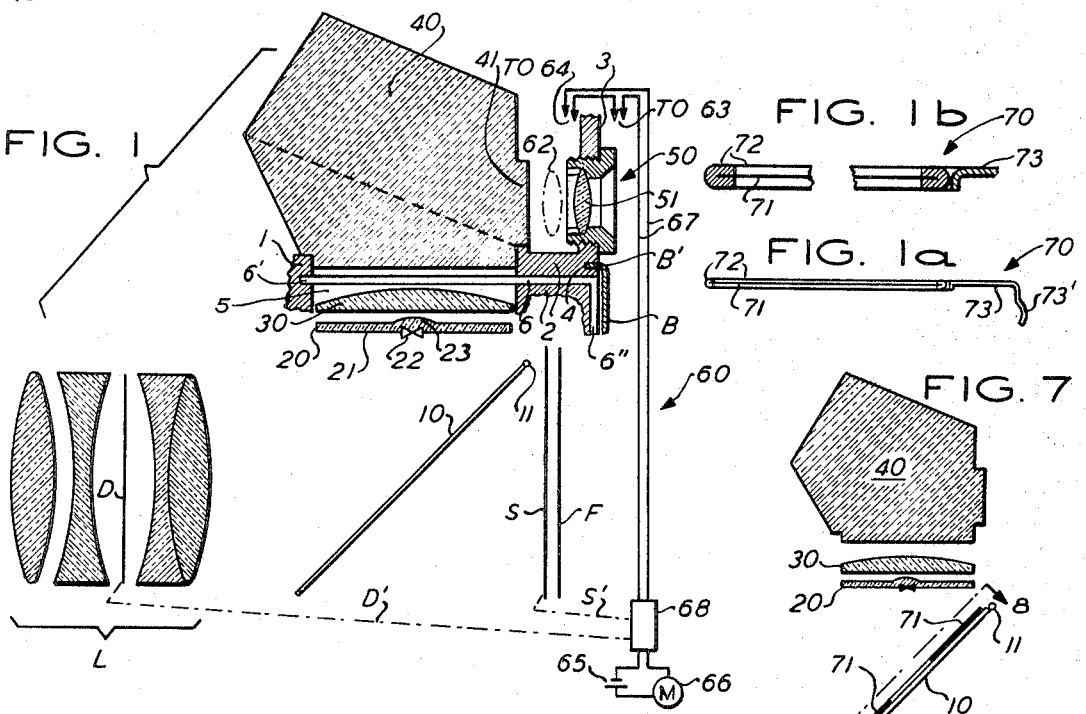

3,347,143
BEHIND-THE-LENS SPOT-METERING IN
SINGLE-LENS-REFLEX CAMERAS
Charles T. Jacobs, Box 362, Bernardsville, N.J. 07924
Filed Sept. 6, 1966, Ser. No. 577,286
14 Claims. (Cl. 95—42)

ABSTRACT OF THE DISCLOSURE

A light-attenuating means in the path between mirror and prism finitely reduces the light intensity reaching the bottom of the prism from all of the focusing-screen area other than a preselected restricted sub-area therein, affecting both the light metering and the viewed image.

---

This invention relates to behind-the-lens spot-metering in single-lens-reflex cameras.

It is known in connection with such cameras to provide light-metering, for exposure-determining purposes, which will be used at the time of preliminary viewing for composition and focusing purposes and which is located behind the lens so as to be affected only by light which will fall on the film area at the time of exposure. It is also known to arrange that metering so that it will be affected only by the light which will fall on a restricted portion only of that area, the purpose of such an arrangement being to enable the determination of proper exposure on the basis of the light from that portion only of the subject matter to be photographed which is of primary interest—such metering arranged in this manner being commonly referred to as behind-the-lens spot-metering.

In single-lens-reflex cameras the preliminary viewing is of an image, formed on a focusing screen, which essentially corresponds both in size and otherwise to that which will be projected to the film during exposure. Presently available behind-the-lens spot-metering systems all involve the diversion, from the very portion of the viewed image which is of primary interest, of at least some portion of the light which would otherwise contribute to the brilliance of that portion and would aid in its focusing; it is an object of the invention to provide spot-metering without any such diversion. In the systems referred to in the preceding sentence it is the portions of the viewed image other than the portion of primary interest which are available to view at full brilliance; it is an object of the invention to reverse this altogether illogical state of affairs.

It is generally recognized that when behind-the-lens spot-metering is employed there is a requirement that it be used with discretion—e.g. when there is a large contrast of light intensity between the portion of primary interest and the remaining portion of the image some compromise exposure is usually called for. No behind-the-lens spot-metering system can altogether eliminate the need for some discretion; it is, however, an object of the invention to reduce the degree to which such discretion needs to be exercized, as well as in many cases to render the needed compromise an automatic one.

When behind-the-lens spot-metering is to be employed the size and position of the metered sub-area or "spot" (relative to those of the entire image) are matters which can sometimes be advantageously varied from one type of subject matter to another. Presently available behind-the-lens spot-metering systems make no provision for variations of either of those parameters; it is an object of the invention to make such provision in a simple manner. It is also an object of the invention to make spot-metering and entire-image-metering readily available on a selective basis.

Presently available behind-the-lens spot-metering cameras involve split condenser constructions, or additional-prism constructions, or special on-the-mirror constructions, which are at least modestly complicated and expensive. It is an object of the invention to achieve behind-the-lens spot-metering with substantially less complication and expense.

It is a general object of the invention to provide improved behind-the-lens spot-metering. Allied and other objects will more fully appear from the following description and the appended claims.

The invention postulates the presence in the single-lens-reflex camera of a mirror positionable in reflecting position, a focusing screen onto a predetermined area of which the reflectingly positioned mirror upwardly reflects lens-projected light to form an image on that area, and a viewing prism onto the bottom of which light from the image is radiated. The camera will thus have a viewing light-transmission path, a particular segment of which may be defined as extending from the reflectingly positioned mirror to the viewing prism. According to the invention there is employed a meter for measuring light reaching the bottom surface of the viewing prism from the focusing screen, the meter being positioned to receive such light from another surface of that prism, and in the above-mentioned segment of the viewing light-transmission path there is located a means for effecting a predetermined finite attenuation of the light which in the absence of that attenuation-effecting means would reach the bottom surface of the viewing prism from all of said area other than a preselected restricted sub-area therein.

The attenuation-effecting means may be a masking means. It may be interposed across the viewing light-transmission path in that portion of the above-defined segment thereof which extends from adjacent and below the focusing screen to the viewing prism. The camera may be provided with a slot whose plane lies across the viewing light-transmission path in the just-mentioned portion thereof, and the masking means may be removably positioned in that slot. The camera may have the usual openable and closeable back, and the slot may be exposed for access when that back is opened and lightproofed by that back when that back is closed.

The attenuation-effecting means may comprise a neutral-density filter material. In some cases the meter may have a sensitivity in a particular portion of the visible spectrum relative to that of the human eye less than its average sensitivity over the entirety of that spectrum relative to that of the human eye, and in such cases the attenuation-effecting means may comprise alternatively a filter material which preferentially passes light in that particular portion of the spectrum. Still alternatively, the attenuation-effecting means may be of polarizing material so that the abovementioned attenuation will be caused to comprise the attenuation inherently incident to polarization—under which circumstances additional polarizing means will be positioned to be traversed by the light received by the meter from the viewing prism and oriented to further attenuate such of that received light as is already polarized.

A detailed description of the invention is presented below. In that description reference is made to the accompanying drawing in which:

FIGURE 1 is a view, partly in vertical section and partly schematic, of a single-lens-reflex camera embodying the invention in one form;

FIGURE 2 is a top view of some of the elements appearing in FIGURE 1 (the line 1—1 in FIGURE 2 denoting the plane on which FIGURE 1 is taken);

FIGURES 1a and 2a are respectively sectional and plan views of the attenuation-effecting means for the camera of FIGURES 1–2;

FIGURE 1b is an enlarged showing of the subject matter of FIGURE 1a;

FIGURE 3 is a view similar to a portion of FIGURE 2 but illustrating an addition appropriate to a modified form of the invention;

FIGURES 4, 5, 6 and 7 are fractional views showing respective alternative positionings of the attenuation-effecting means; and FIGURE 8 is a view taken along line 8—8 of FIGURE 7.

Reference being had to FIGURES 1 and 2, there will be seen (principally in FIGURE 1) the basic parts of a single-lens-reflex camera. At the front of the camera there appears (without its barrel) a typical lens L, its conventional between-the-elements diaphragm being schematically indicated as D. At the back of the camera there appear the film and a so-called focal-plane shutter of variable exposure duration, indicated schematically as F and S. Between the lens L and shutter S there appears the mirror 10 pivotally supported at a point such as 11, it being understood that at least at the moment of exposure (by operation of shutter S) the mirror 10 will be rocked upwardly about point 11 from its illustrated to an essentially horizontal position so as fully to expose the film (through the shutter) to the lens. The invention is primarily concerned with acts preparatory to exposure, and during those acts the mirror will occupy its illustrated reflecting position (of substantially 45° inclination) in which, instead of permitting the light projected by the lens to pass rearwardly to the region of the shutter and film, it will divert that lens-projected light from the shutter and film by reflecting it upwardly.

Above the mirror 10 there appears a focusing screen 20, typically in the form of a horizontal thin rectangle of glass the effective one of whose surfaces (e.g., its bottom surface 21) has been suitably processed so that the lens-projected light reflected by the mirror forms an image on a predetermined area (which may for example be substantially the whole area) of the focusing screen. The screen may be provided, typically at its center, with focusing aids, such as schematically illustrated by the central small prism rangefinder arrangement 22 in the bottom surface 21 and by the convex shaping 23 of the central portion of the top surface—it being understood, however, that these and other known focusing aids may be alternatively employed as desired.

Light from the image formed on the focusing screen 20 will be radiated, importantly in an upward direction. To provide for viewing of the image from the rear of the camera a substantial part of the upwardly radiated light must be re-directed rearwardly and should be appropriately collected. That rearward reflection may be accomplished by a viewing prism of the so-called "roof pentaprism" variety (which in order to keep the image correct in its up-and-down orientation and at the same time to accomplish a reversal of the mirror-reversed left and-right orientation provides for two up-and-down internal reflections and for three left-and-right internal reflections) whose bottom or light-entry surface is positioned somewhat above the focusing screen 20; that collection may be accomplished by an eyepiece 50 comprising a small viewing lens 51 positioned somewhat to the rear of the rear or light-exit surface of the viewing prism 40. That collection may be aided and the brilliance of the image as seen through the eyepiece 50 increased by the interposition between the focusing screen 20 and the viewing prism 40 of an appropriate rectangularly shaped condenser or magnifying glass 30.

The basic parts of the camera as thus described with reference to FIGURES 1 and 2 will be recognized as being those of any of a variety of widely distributed single-lens-reflex cameras, and as being therefore wholly conventional. A conventional pair of controls for the shutter S, one for adjusting the duration of exposure and the other for invoking operation of the shutter (and thus the exposure of the film), will of course be employed and may be considered as embraced within the schematic illustration of the shutter.

Less widespread but nevertheless well known is the use, for the purpose of determination of proper exposure of the film through the lens and shutter, of a meter for measuring light projected (within the confines of that area of the focusing screen 20 on which the image is formed) into the camera by the lens L; such a meter is used at or about the time of viewing through the eyepiece 50 for purposes of composition and focusing. One important class of such meters serves to measure light which has reached the bottom surface of the viewing prism from the focusing screen, the meter receiving its actuating light from another surface of that prism, and in FIGURES 1 and 2 a meter of that class is schematically shown and designated generally as 60. It may comprise (as best seen in FIGURE 2) two small collecting lenses 61 and 62 respectively positioned to the left and right of the eyepiece 50 (for example, together with the eyepiece, opposite a rearwardly projecting horizontal "rib" 41 provided on the viewing prism 40 and whose rear surface then forms the active light-exit surface of the prism) and two photo-conductors 63 and 64 (for example of the cadmium-sulfide variety) respectively positioned behind the collecting lenses 61 and 62, the photo-conductors 63 and 64 being electrically interconnected (for example in series). It may further comprise (as best seen in FIGURE 1) a battery cell 65, a meter movement 66 and electrical conductors 67 by which the two photo-conductors are connected in an electrical circuit (which may be closed during the light-metering) with the battery 65 and meter movement 66. It may still further comprise a mechanically controllable electrical network 68, for example interposed in the electrical conductors 67, mechanically coupled to the shutter's exposure control (as indicated by the dash-dot line S') and serving automatically to vary the meter reading in direct proportion to the duration of the exposure for which the shutter S is set.

Upwardly radiated light from the image formed on the focusing screen 20 (other than but typically quite proportional to that collected by the eyepiece 50) will, after reaching and passing through the viewing prism 40, be collected by the lenses 61 and 62 and thereby projected onto the photo-conductors 63 and 64, the resulting electrical resistances of which will regulate the current flowing from the battery 65 through the meter movement 66 to yield a reading by that meter movement of the intensity of light which has reached the bottom of the viewing prism. In view of the abovementioned coupling S' between the meter movement and the shutter's exposure control that reading will be lower the shorter be the duration of exposure for which the shutter is set; in view of the inherent effect of the opening of the diaphragm D on the light which will reach the bottom of the viewing prism the meter-movement reading will be lower the smaller be the diaphragm opening. It is customary to provide the meter movement with a relatively short scale only, centered on the reading of that light intensity which will be appropriate to proper exposure of the film—the manner of availment of the benefit of the meter being the adjustment of the shutter's exposure duration and/or of the diaphragm's opening until the meter movement's needle is centered in that short scale.

The opening of the diaphragm D which is to exist during exposure is of course established prior to exposure, but it is common (for such purposes as last-minute most accurate focusing) to permit the diaphragm after that establishment to temporarily assume its maximum opening pending the actual invoking of the exposure (at the time of which the diaphragm will assume the pre-established opening)—arrangements for which action may be considered as embraced within the schematic illustration of the diaphragm. The immediately foregoing two paragraphs postulate that during the light-metering the diaphragm will have the opening which is to exist during exposure, for which action many known single-lens-reflex cameras are arranged. There are other such cameras, however, which are arranged so that the diaphragm during the light-metering will invariably be at its maximum opening (rather than the one pre-established for the actual exposure); in such cameras the effect, on the light-metering, of that diaphragm opening which has been or is being pre-established for exposure purposes is simulated by the action of an appropriate mechanical coupling of the network 68 also to the diaphragm D. Such a coupling of the network to the diaphragm is schematically indicated in FIGURE 1 by the dash-dot line D′—but it will be understood that it will be employed only in the cameras dealt with in the preceding sentence.

The light-metering will ordinarily also be subjected to control in accordance with the emulsion speed of the film F, as by a mechanical control of the network 68 also in accordance with that speed; arrangements to accomplish this, being old in the art, are not herein shown or described. Still further, the meter movement 66 will ordinarily be arranged so that its needle will be visible through the eyepiece 50; again the arrangements therefor, being known in the art, are not herein shown or described.

In the embodiment of FIGURES 1 and 2 there are fractionally illustrated front and rear camera-frame portions 1 and 2 respectively, just below and for example supporting the viewing prism 40; at its rear the frame portion 2 may typically be continued upwardly to form a flange 3 which may serve as a mount for the eyepiece 50 (and if desired for other elements, such as the photo-conductors 63 and 64, as well). In its rear surface, for example below the flange 3, the rear frame portion 2 may typically be provided with a shallow thin slot 4 which will accommodate in a light-sealing manner the flange B′ of the fractionally-shown openable and closeable camera back B. Certain of the elements referred to in this paragraph will be referred to in the description of the first embodiment of the invention proper, to which attention may now be directed.

Passing completely through the frame portion 2, at a level which is below the shallow flange-accommodating slot 4 and is between the bottom of the viewing prism 40 and the top of the condenser 30, there is shown a slot 6, which in shallow lateral depth may extend around the sides and front of the rectangular aperture 5 through which light is radiated upwardly from the condenser 30 to the viewing prism 40—that shallow depth of the slot 6 being shown at 6′ in the frame portion 1. It is into the slot 6 that there may be removably inserted a masking means 70 illustrated in FIGURES 1a and 2a and next to be described. It may be mentioned in passing that the plane of the slot 6 lies across that portion of the viewing light-transmission path of the camera which intervenes between the focusing screen 20 and the viewing prism 40.

The masking means 70 may basically comprise a rectangular sheet 71 of transparent material whose typical nature is hereinafter more fully described, provided with a cut-out 71′ from which its material has been removed. The shape, size and positioning of the cut-out are hereinafter more fully dealt with; it may, however, here be mentioned that as illustrated in FIGURE 2a that shape is substantially proportional to the shape of the area of the image on the focusing screen 20 (which in turn will be substantially similar to the area of the film F to be exposed), that size is about 20% of that area (each linear dimension being about 45% of the corresponding linear dimension of that area), and that position is central of that area. As best seen in FIGURE 1b (which is an enlargement of FIGURE 1a) the sheet 71 may for example be retained in a metal frame 72 formed by crimping a narrow strip of thin metal about the marginal portions of the sheet. Lugs 73 secured to and extending rearwardly from the rear edge of the frame 72 may be provided to facilitate the insertion of the masking means 70 into and its removal from the slot 6, which can readily be effected when the camera back B is open. The lugs 73 may for example have folded-down rear portions 73′ which, when the masking means 70 is in inserted position in the slot 6, may lie in an appropriate recess 6″ provided in the frame portion 2 as a downwardly directed extension of the slot 6 at its rear; the camera back B may then serve both snugly to retain the masking means 70 in the slot 6 and to lightproof that slot.

In its simplest form the sheet 71 may be one of gelatin appropriately treated with a dye so that the sheet effects a several-times attenuation of light passing therethrough; thus the material of 71 may amount to the material of a simple photographic filter. The dye may typically be a so-called "neutral-density" dye—i.e. one which causes the sheet to substantially uniformly attenuate meter-actuating light of different wavelengths (i.e. colors) passing therethrough—under which circumstances the material of 71 amounts to that of a simple neutral-density filter. By way of specific example, the material of 71 may effect a 10-times attenuation of light in whose path it is interposed.

With the presence in the slot 6 of a masking means comprising the specific material described in the last paragraph and having a cut-out as described in the second preceding paragraph, of the image on the focusing screen 20 light from the 20% central portion will be transmitted to the viewing prism (and thus both to the eyepiece and to the meter) at full intensity, but light from the 80% marginal portion will be transmitted at only 10% intensity. Obviously, in the simple case of an image whose average light intensity per unit area is the same in both those portions, the overall or integrated intensity of the light transmitted therefrom to the viewing prism will be only 28% of what it would be in the absence of the masking means. One effect of this is to reduce the meter reading to 28% of what it otherwise would be; this effect, however, may be precisely annulled by an adjustment, of the light-metering as influenced by film emulsion speed, to 3.5 times normal—i.e. an adjustment such as would have been made if that speed were 3.5 times as great as it actually is—and that adjustment will (unless otherwise noted) be assumed in the succeeding description.

For convenience there may here be defined a terminology, having to do with light-intensity or exposure ratios, which greatly facilitates the further description. The term "stop-third" will be employed to denote a ratio of 1.25; thus 2 stop-thirds will denote a ratio of 1.6, 3 stop-thirds a ratio of 2, 4 stop-thirds a ratio of 2.5—and so on. (Note is made that this ratio of 1.25 is the one between successive emulsion speeds in the most widely used progression thereof.) It may be observed that the abovementioned 10-times factor of the material of sheet 71 may be characterized as one of 10 stop-thirds and that the abovementioned 3.5-times alteration of the light-metering adjustment may be characterized as one of 5.5 stop-thirds.

A further effect of the reduction (by 10 stop-thirds) of the light intensity of the 80% marginal portion of the image is of course a reduction of 10 stop-thirds in the brilliance of that marginal portion as seen through the eyepiece 50. This is of course not compensated for by the abovementioned alteration of the light-metering adjustment; it is, however, compensated for to a very appreciable (even though not complete) degree as a result of the abovementioned reduction of the overall or integrated light intensity of the image (a reduction of 5.5 stop-thirds), which inherently causes the viewer's eye pupil to readjust to a substantially more open condition. And in view of that pupil-readjustment there is achieved the strong incidental advantage of actually increased visual perception of the 20% central portion of the image, very appreciably aiding focusing (which is of course accomplished in that central portion)—beside which there is moreover the physiological benefit of enhanced urge to concentrate attention on the image portion of primary interest.

In the case so far considered—that wherein the 80% marginal and 20% central portions of the image have similar average light intensities per unit area—there would be essentially no need for the spot-metering action which is an important object of the invention. But that is an "ideal" and typically infrequent case; far more often the average light intensity per unit area of the 80% marginal portion will be very substantially greater or less than that of the 20% central portion, and it is in those more frequent cases that the spot-metering action becomes of importance.

Let attention now be turned to a case in which the 80% marginal portion has an average light intensity per unit area of only 40% of (i.e. 4 stop-thirds less than) that of the 20% central portion. For that case it may readily be shown that in the ordinary event of absence of the masking means 70 (by which is meant also the non-alteration of the light-metering adjustment) the light-metering will call for an exposure 2.8 stop-thirds more than that which would be appropriate for the 20% central or primary-interest portion considered by itself; it is true that the presence of the much dimmer marginal portion would probably call for the compromise of a slight increase of the exposure otherwise appropriate for the central portion, but only to the extent of a minor portion of the above-mentioned 2.8 stop-thirds. Contrastingly, it may be shown that in the presence of the masking means 70 (by which is meant also the abovementioned alteration of the light-metering adjustment) the light-metering will call for an exposure of only 0.9 stop-thirds more than that which would be appropriate for the central portion considered by itself—that 0.9 stop-thirds being typically a very suitable compromise of the desirable nature just referred to.

Let there be considered a more extreme case in which the 80% marginal portion has an average light intensity per unit area of only 20% of (i.e. 7 stop-thirds less than) that of the 20% central portion. For that case in the ordinary event of absence of the masking means the light-metering will call for an exposure 4.4 stop-thirds more than would be appropriate for the 20% central area by itself; contrastingly, in the presence of the masking means the light-metering will call for an exposure of only 1.2 stop-thirds more than would be appropriate for the central portion by itself—that 1.2 stop-thirds again being typically a very suitable compromise.

The last two paragraphs have concerned themselves with cases in which the 80% marginal portion of the image is dimmer than the 20% central portion; possibly even more frequent are those cases in which it is brighter. Let there be considered a case in which that marginal portion has an average light intensity per unit area of 2.5 times (i.e. 4 stop-thirds greater than) that of the 20% central portion. (Such a case might typically be one wherein about half of the marginal portion has about the same average light intensity per unit area as the central portion but the other half has about 4 times, or 6 stop-thirds more than, that much.) For that case in the ordinary event of absence of the masking means the light-metering will call for an exposure 3.4 stop-thirds less than would be appropriate for the central area by itself; contrastingly, in the presence of the masking means the light-metering will call for an exposure of only 1.5 stop-thirds less than would be appropriate for the central portion by itself—an exposure typically within 0.5 stop-third of that which typically would be the most suitable compromise.

Let there be considered a more extreme case in which the 80% marginal portion has an average light intensity per unit area of 5 times (i.e. 7 stop-thirds greater than) that of the 20% central portion. (Such a case might typically be one wherein about half of that marginal portion has about the same average light intensity per unit area as the central portion but the other half has about 9 times, or 9.5 stop-thirds more than, that much.) For that case in the ordinary event of absence of the masking means the light-metering will call for an exposure of 6.2 stop-thirds less than would be appropriate for the central portion by itself; contrastingly, in the presence of the masking means the light-metering will call for an exposure of only 3.2 stop-thirds less than would be appropriate for the central portion by itself. While in some instances this might typically be a trifle less than the best compromise exposure, it still remains 3 stop-thirds more than the quite serious underexposure which would be called for in the ordinary event.

The foregoing typical cases will have served to make apparent the beneficial action of a useful embodiment of the invention. It is of course to be understood that the attenuation therein assumed for the material of the sheet 71—10 times, or 10 stop-thirds—is not a unique one, it having been chosen to yield usually suitable exposure compromises between the marginal and central portions of the image as well as to leave sufficiently visible the marginal portions of the image as viewed through the eyepiece 50, and that there is intended in this respect no unexpressed limitation.

The foregoing description has disclosed the typical use, for the sheet 71, of a neutral-density material. It is alternatively possible to use therefor a colored material—a purpose of such use being to take advantage of the discrepancies which typically exist between the response/wavelength characteristic of the meter 60 and that of the average human eye, thereby in turn to reduce the attenuation of the marginal portion of the image perceived by the eye during viewing while maintaining that attenuation thereof which affects the light-metering. For such a purpose, with photo-conductors 63 and 64 of the cadmium-sulfide variety, the material of the sheet 71 may be a photographic filter material which preferentially passes light of the low-wavelength end portion of the visible spectrum—e.g. of and/or close to a blue color. It is to be recognized, however, that the use of such a material depends for its advantage on some inherent discrepancy or discrepancies between the characteristics of the light-metering (and of the film material, for which it is intended to be efficacious) and of the human eye—toward the minimization of which the art may be expected to progress.

Although as pointed out above the attenuation of the marginal portions of the image as perceived by the eye in viewing is not normally a serious disadvantage (and even involves some elements of advantage), there may nevertheless be cases in which it is desired substantially to avoid it. Resort may then be had to a variation wherein the sheet 71 is of polarizing material, so that the light attenuation which it effects will comprise that attenuation which is incident to polarization (preferably principally, if not exclusively, that attenuation)—and wherein there is employed additional polarizing means positioned to be traversed by the light received by the meter 60 from the viewing prism 40 and oriented to further attenuate such of that light as has already been polarized by the sheet 71.

Typical such additional polarizing means are shown in the fractional FIGURE 3, which re-illustrates a portion of FIGURE 2 without change excepting for the securing to the rear surface of rib 41 (which forms the light-exit surface of the viewing prism 40)—opposite to the meter's collecting lenses 61 and 62 but not opposite the eyepiece 50—of respective small sheets 81 and 82 of polarizing material. These sheets will be oriented so that such light passing therethrough as has already been polarized by the sheet 71 (i.e. light from the marginal portion of the image) will be further attenuated to the desired degree (for example the abovementioned 10 times, or 10 stop-thirds); the other light passing therethrough (i.e. light from the central portion of the image) will suffer only that attenuation which results from one polarization (for the very small degree of which compensation may be made in the abovementioned readjustment of the light-metering). This variation is of excellent utility—subject, however, to certain limitations which it tends to impose on the freedom with which polarizing filters can be used on the lens L.

It will of course be understood that the construction of the masking means 70 in FIGURES 1a and 2a is typical only, having been chosen for purposes of simplicity of illustration, and that no limitation is thereby intended to absence of conventional means for protecting the surfaces of the sheet 71 or of other techniques such as are commonly employed in connection with simple photographic filters.

Reverting more specifically to the camera of FIGURES 1 and 2, it may be noted that the vertical position of the masking or attenuation-effecting means 70 (i.e. a position adjacent the bottom of the viewing prism, or adjacent the top of the condenser, or more specifically in a slot whose level lies therebtween) therein has been dictated both by the feature of removability and by the geometry of that particular camera as it affects the position where such removability can readily be provided for. In cameras of somewhat altered geometry the removability may be achievable with a somewhat different choice of vertical position of that means—and in cases wherein removability is not sought (i.e. wherein a permanently installed masking means is acceptable) a still wider choice of vertical position is afforded.

In general, the masking or attenuation-effecting means may be interposed across the viewing light-transmission path of the camera within that segment thereof which extends from the reflectingly positioned mirror to the viewing prism. In FIGURES 4, 5, 6 and 7 there are shown—in each instance without effort to provide for removability—several other typical positions of that means within that segment of the viewing light-transmission path. In each of those figures there appear, in a reduced scale, the mirror 10, the focusing screen 20, the condenser 30 and the viewing prism 40 of FIGURES 1–2. In view of the small scale no effort has been made to show the masking or attenuation-effecting means' sheet 71 in its typical thinness; instead its non-cut-out portions have been shown in section by solid lines of appreciable thickness.

Thus the masking or attenuation-effecting means 70, typically in the form simply of the cut-out sheet 71, may be adjacent or at the bottom surface of the viewing prism 40—for example, appropriately cemented thereto—this positioning being illustrated in FIGURE 4. Alternatively it may be adjacent or at one of the surfaces of the condenser 30—again for example appropriately cemented thereto—FIGURE 5 illustrating this positioning, with the condenser surface chosen for the purpose being the bottom surface. Still alternatively it may be adjacent or at one of the surfaces of the focusing screen 20—again for example appropriately cemented thereto—FIGURE 6 illustrating this positioning, with the screen surface chosen for the purpose being the bottom surface (which may be, and as typically contemplated in the illustrated camera constructions is, the active or focusing surface of that screen). Note is made that when, as illustrated and preferred, the cut-out 71' is substantially central of the sheet 71, that sheet poses no interference with focusing aids (such as designated in FIGURE 1 as 22 and 23) provided centrally of the focusing screen, even though it be intimately associated with one or the other of the focusing-screen surfaces. In the particular case wherein the masking means is to be provided at the active or focusing surface of the focusing screen 20, it may alternatively be provided by a suitable dyeing or other treatment of that surface.

It may be pointed out that the positioning of the masking or attenuation-effecting means 70 affects the pressure or absence of some vignetting of the line of demarcation between the marginal and central portions of the image as seen in the eyepiece 50 (and as sensed by the meter 60). Of the positionings so far described the position illustrated in FIGURE 4 will produce the most such vignetting—but still a vignetting of very minor and altogether acceptable degree, since that position is displaced from the image (i.e. from the active surface of the focusing screen 20) only by a distance very small compared to the length of the path actually traversed by light in passing from the image to the eyepiece. Slightly less vignetting of that line is produced with the positioning shown in FIGURES 1–2, still less with that of FIGURE 5, and none at all with that of FIGURE 6 (provided the masking means be at the active or focusing surface).

The positionings of the masking or attenuation-effecting means described in connection with FIGURES 4, 1–2 and 5, and that described in connection with FIGURE 6 when the masking means is above the active surface of the focusing screen, are all positionings within that stretch of the abovementioned segment of the viewing light-transmission path which is traversed by radiated light. The position described in connection with FIGURE 6 when the masking means is below the active surface of the focusing screen is a positioning within that stretch of that segment of the viewing light-transmission path which is traversed by projected light. Other positionings within the latter portion are also possible, a limiting one being shown in FIGURE 7.

In FIGURE 7 (and the related FIGURE 8) the masking or attenuation-effecting means is shown as again provided by the sheet 71, in this instance secured (as by appropriate cementing) to the reflecting surface of the mirror 10. In this case the cut-out from the sheet, whose shape is to be seen in FIGURE 8 and which is designated as 71'', must, if it is to provide a rectangular central portion in the image on the focusing screen in spite of the inclination of the reflectingly positioned mirror, be of suitable trapezoidal shape. Further to be noted is that with this positioning of the masking or attenuation-effecting means the non-cut-out portion of that means will be twice traversed by the light (rather than only once as in all the previously illustrated positionings), with the result that the attenuation it effects in each one transmission of light therethrough must be only a fraction of the total which it is to effect—e.g. if that total be 10 times (or 10 stop-thirds), the attenuation in each one or attenuation-effecting transmission must be only 3.2 times (or 5 stop-thirds). Still further to be noted is a substantially increased vignetting, of the line of demarcation between the marginal and central portions of the image, which will be progressively more pronounced toward the top of the image (i.e. the portion of the image which represents the top of the picture material being viewed).

It may be mentioned that a problem encountered with single-lens-reflex cameras having light meters of the class herein contemplated has been the reverse entry of unshielded light through the eyepiece 50 into the viewing prism and therefrom downwardly onto the focusing screen, from which part of that light is in turn radiated upwardly so that some of it reaches the meter and forms a spurious addition to the through-the-lens light which alone is intended to reach the meter. It may be pointed out that the invention, when carried out with a masking means interposed across the viewing light-transmission path in that portion thereof which lies between the focusing screen and the viewing prism, aids to a modest extent in the solution of this problem. This results from the fact that under such circumstances reverse light downwardly reaching and then suffering a partial radiation upwardly from the marginal portion of the focusing screen must pass twice through the masking means, in which process it is typically so attenuated as to become negligible; the unattenuated reverse light downwardly reaching the central portion of the focusing screen does of course experience the usual partial upward radiation therefrom—but this light is typically only 20% of the light in the ordinary case and, even after taking into account the 3.5 times increase in sensitivity of the light-metering, will produce in that metering only 70% as much effect.

The foregoing description has been in terms of a masking or attenuation-effecting means, differentiating a selected portion from the remaining portion of the image, in which that selected portion is rectangular, is of about 20% of the area of the image, and is positioned centrally of that area. The selection of such a portion has proved to be a most frequently desirable one; it is not, however, a uniquely ideal selection, and there may well be classes of subject matter to be photographed for which other shapes, sizes and/or positionings of the selected area will be preferable. The invention contemplates that the area will be selected as desired—indeed, in the embodiment of FIGURES 1–2 the insertibility and removability of the masking means by the camera user makes provision for the change of such selection from time to time as may be desired—as well as for the change of the selection of masking-means material and attenuation, if and when that may be found desirable.

It will of course further be obvious that in an embodiment such as that of FIGURES 1–2 the insertability and removability of the masking means makes provision for the selective use and non-use of spot-metering.

The abovementioned use of a colored rather than a neutral-density material for the sheet 71 may supplementarily be somewhat more broadly described as the use, in connection with a meter whose sensitivity in a particular portion of the visible spectrum relative to that of the human eye is less than its average sensitivity over the entirety of that spectrum relative to that of the human eye, of a material which preferentially passes light of that particular portion of the spectrum.

In the foregoing description and in the appended claims the preposition "adjacent" is used in its broader significance of meaning either close to or precisely at, the significance of the somewhat narrower preposition "at" being therefore embraced within its meaning.

While I have shown and described the invention in terms of particular embodiments thereof, I intend thereby no unnecessary limitations. Modifications in many respects will be suggested by my disclosure to those skilled in the art, and such modifications will not necessarily constitute departures from the spirit of the invention or from its scope, which I undertake to define in the appended claims.

I claim:

1. The combination, with a single-lens-reflex camera having a mirror positionable in reflecting position, a focusing screen onto a predetermined area of which the mirror when in reflecting position upwardly reflects lens-projected light to form an image on that area, and a viewing prism onto the bottom of which light from the image is radiated, the viewing light-transmission path of the camera comprising a segment extending from the reflectingly positioned mirror to the viewing prism: of a meter for measuring light reaching the bottom surface of the viewing prism from the focusing screen, the meter being positioned to receive such light from another surface of that prism, and masking means interposed across the viewing light-transmission path in said segment thereof for effecting a predetermined finite attenuation of the light which in the absence of the masking means would reach the bottom surface of the viewing prism from all of said area other than a preselected restricted sub-area therein.

2. The combination claimed in claim 1 wherein said masking means is interposed across said viewing light-transmission path in that portion of said segment thereof which extends from adjacent and below said focusing screen to said viewing prism.

3. The combination claimed in claim 2 wherein said masking means is adjacent the bottom surface of said viewing prism.

4. The combination claimed in claim 2 wherein said camera further has a condenser interposed between said focusing screen and said viewing prism, and wherein said masking means is adjacent a surface of said condenser.

5. The combination claimed in claim 2 wherein said masking means is adjacent a surface of said focusing screen.

6. The combination claimed in claim 2 wherein said camera further has means providing a slot whose plane lies across said viewing light-transmission path in said portion of said segment thereof and in which said masking means is removably inserted.

7. The combination claimed in claim 6 wherein said camera further has an openable and closeable back, and wherein said slot is exposed for access when said back is opened and is lightproofed by said back when said back is closed.

8. The combination, with a single-lens-reflex camera having a mirror positionable in reflecting position, a focusing screen onto a predetermined area of which the mirror when in reflecting position upwardly reflects lens-projected light to form an image on that area, and a viewing prism onto the bottom of which light from the image is radiated, the viewing light-transmission path of the camera comprising a segment extending from the reflectingly positioned mirror to the viewing prism: of a meter for measuring light reaching the bottom surface of the viewing prism from the focusing screen, the meter being positioned to receive such light from another surface of that prism, and means located in said segment of the viewing light-transmission path for effecting a predetermined finite attenuation of the light which in the absence of that attenuation-effecting means would reach the bottom surface of the viewing prism from all of said area other than a preselected restricted sub-area therein.

9. The combination claimed in claim 8 wherein said attenuation-effecting means is at said mirror.

10. The combination claimed in claim 8 wherein said attenuation-effecting means comprises a neutral-density filter material.

11. The combination claimed in claim 8 wherein said meter has a sensitivity in a particular portion of the visible spectrum relative to that of the human eye less than the average sensitivity of said meter over the entirety of said spectrum relative to that of the human eye, and wherein said attenuation-effecting means comprises a filter material which preferentially passes light in that particular portion of said spectrum.

12. The combination claimed in claim 8 wherein said meter is of the cadmium-sulfide variety, and wherein said attenuation-effecting means comprises a filter material which preferentially passes light of the low-wavelength end portion of the visible spectrum.

13. The combination claimed in claim 8 wherein said attenuation-effecting means is of polarizing material whereby said attenuation is caused to comprise the attenuation inherently incident to polarization, said combination further including additional polarizing means positioned to be traversed by the light received by said meter from said viewing prism and oriented to further attenuate such of that received light as is already polarized.

14. The combination claimed in claim 13 wherein said first-mentioned attenuation consists at least principally of the attenuation inherently incident to polarization.

References Cited

UNITED STATES PATENTS 3,282,178—11/1966 Nelson _____ 95—42

JOHN M. HORAN, *Primary Examiner.*